United States Patent
Weiß et al.

(10) Patent No.: US 9,895,852 B2
(45) Date of Patent: Feb. 20, 2018

(54) METHOD FOR PRODUCING A COMPOSITE BODY

(71) Applicant: SCHUNK KOHLENSTOFFTECHNIK GMBH, Heuchelheim (DE)

(72) Inventors: Roland Weiß, Huettenberg (DE); Martin Henrich, Wetzlar (DE); Thorsten Scheibel, Bad Nauheim (DE); Marco Ebert, Biebertal (DE); Andreas Lauer, Kirchhain (DE); Walter Krenkel, Bayreuth (DE); Carolin Spatz, Bindlach (DE); Karl Maile, Stuttgart (DE); Karl Berreth, Leonberg (DE); Jens Schmidt, Bayreuth (DE); Christian Eckardt, Selb (DE); Sandro Bischoff, Kasendorf (DE); Klaus Metzger, Neustadt/Weinbstrasse (DE); Karl-Heinz Czychon, Weinheim (DE)

(73) Assignee: SCHUNK KOHLENSTOFFTECHNIK GMBH, Heuchelheim (DE)

( * ) Notice: Subject to any disclaimer, the term of this patent is extended or adjusted under 35 U.S.C. 154(b) by 336 days.

(21) Appl. No.: 14/439,688

(22) PCT Filed: Sep. 20, 2013

(86) PCT No.: PCT/EP2013/069546
§ 371 (c)(1),
(2) Date: Apr. 30, 2015

(87) PCT Pub. No.: WO2014/067706
PCT Pub. Date: May 8, 2014

(65) Prior Publication Data
US 2015/0290885 A1      Oct. 15, 2015

(30) Foreign Application Priority Data

Oct. 30, 2012   (DE) .................. 10 2012 219 870

(51) Int. Cl.
*B29C 70/86*       (2006.01)
*B32B 15/14*       (2006.01)
(Continued)

(52) U.S. Cl.
CPC ............ *B29C 70/86* (2013.01); *B29C 70/32* (2013.01); *B29C 70/36* (2013.01); *B32B 1/02* (2013.01);
(Continued)

(58) Field of Classification Search
CPC ..... B29C 70/86; B29C 70/865; B29C 53/582; B29C 53/785; B29C 53/602; F17C 1/06;
(Continued)

(56) References Cited

U.S. PATENT DOCUMENTS 2,744,043 A     5/1956  Ramberg
4,559,974 A  *  12/1985  Fawley ................ B29C 53/66
                                                                138/172
(Continued)

FOREIGN PATENT DOCUMENTS

DE      690 13 606 T2    3/1995
DE     102006038713 A1   11/2007
(Continued)

OTHER PUBLICATIONS

International Search Report dated Feb. 10, 2014 in connection with PCT/EP2013/069546.
(Continued)

*Primary Examiner* — Carson Gross
(74) *Attorney, Agent, or Firm* — Quarles & Brady LLP

(57) ABSTRACT

The invention relates to a method for producing a composite body and to a composite body produced using the method,
(Continued)

Figure 1:
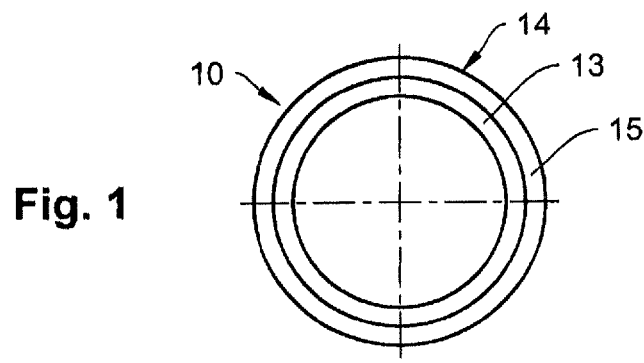

wherein the composite body (10) is formed as a pressure pipe or as a pressure container, wherein the composite body is composed of a main body (13) that is made of steel and of a coat (14) that is made of a fiber composite (15), said coat enclosing the outside of the main body at least in some sections, wherein, for forming the fiber composite, a fibrous material is wound around the main body, wherein the fibrous material is impregnated with a resin before or after winding, wherein the wound and impregnated fibrous material is heated in order to form the fiber composite, wherein the method is carried out in situ on a built-in pressure pipe or pressure container, wherein the wound and impregnated fibrous material is heated to up to 700° C.

20 Claims, 1 Drawing Sheet

(51) Int. Cl.
| | | |
|---|---|---|
| B32B 1/02 | (2006.01) | |
| F16J 12/00 | (2006.01) | |
| F16L 9/147 | (2006.01) | |
| F17C 1/06 | (2006.01) | |
| B29C 70/32 | (2006.01) | |
| B29C 70/36 | (2006.01) | |
| B32B 1/08 | (2006.01) | |
| B32B 5/26 | (2006.01) | |
| B29C 53/58 | (2006.01) | |
| B29C 53/78 | (2006.01) | |
| B29K 83/00 | (2006.01) | |
| B29K 105/08 | (2006.01) | |
| B29K 309/02 | (2006.01) | |
| B29K 309/04 | (2006.01) | |
| B29K 705/12 | (2006.01) | |
| B29L 9/00 | (2006.01) | |
| B29L 23/00 | (2006.01) | |
| B29L 31/00 | (2006.01) | |

(52) U.S. Cl.
CPC .................. *B32B 1/08* (2013.01); *B32B 5/26* (2013.01); *B32B 15/14* (2013.01); *F16J 12/00* (2013.01); *F16L 9/147* (2013.01); *F17C 1/06* (2013.01); *B29C 53/582* (2013.01); *B29C 53/785* (2013.01); *B29K 2083/00* (2013.01); *B29K 2105/0872* (2013.01); *B29K 2309/02* (2013.01); *B29K 2309/04* (2013.01); *B29K 2313/00* (2013.01); *B29K 2705/12* (2013.01); *B29L 2009/003* (2013.01); *B29L 2023/22* (2013.01); *B29L 2031/7156* (2013.01); *B32B 2250/02* (2013.01); *B32B 2250/20* (2013.01); *B32B 2255/02* (2013.01); *B32B 2255/26* (2013.01); *B32B 2260/023* (2013.01); *B32B 2260/046* (2013.01); *B32B 2439/40* (2013.01); *B32B 2597/00* (2013.01); *F17C 2203/0665* (2013.01); *F17C 2209/2154* (2013.01); *F17C 2209/2163* (2013.01)

(58) Field of Classification Search
CPC ................ F17C 1/16; F17C 2203/0665; F17C 2209/2154; F17C 2209/2163; B29L 2031/7156; F16J 12/00; B32B 2439/40; B29K 2309/02; B29K 2309/04; B29K 2105/0872; B29K 2105/0881; B29K 2105/089
See application file for complete search history.

(56) References Cited

U.S. PATENT DOCUMENTS

| | | | | |
|---|---|---|---|---|
| 5,932,335 | A * | 8/1999 | Keller | .......... C08J 5/06 427/228 |
| 6,354,334 | B1 * | 3/2002 | Ellyin | ...... B29C 70/86 138/143 |
| 2009/0101658 | A1* | 4/2009 | Maile | ......... B32B 1/02 220/590 |
| 2009/0314785 | A1* | 12/2009 | Cronin | ........ B29C 53/602 220/590 |
| 2011/0003163 | A1* | 1/2011 | Wood | ...... B29C 43/203 428/525 |
| 2011/0309076 | A1* | 12/2011 | Liebenberg | ...... F17C 13/025 220/203.01 |
| 2012/0234840 | A1 | 9/2012 | Strassburger et al. | |
| 2015/0292677 | A1* | 10/2015 | Curless | ........ B29C 70/086 206/0.6 |

FOREIGN PATENT DOCUMENTS

| | | |
|---|---|---|
| DE | 602004012033 T2 | 2/2009 |
| DE | 10 2010 043645 A1 | 5/2012 |
| WO | 9831964 A1 | 7/1998 |
| WO | 2007128837 A1 | 11/2007 |

OTHER PUBLICATIONS

PCT English Language Translation of the International Preliminary Report on Patentability, PCT/EP2013/069546, May 14, 2015.

* cited by examiner

METHOD FOR PRODUCING A COMPOSITE BODY

CROSS-REFERENCE TO RELATED APPLICATIONS

This application represents the national stage entry of PCT International Application No. PCT/EP2013/069546 filed Sep. 20, 2013, which claims priority of German Patent Application No. 10 2012 219 870.9, filed Oct. 30, 2012, the disclosures of which are incorporated by reference here in their entirety for all purposes.

The invention concerns a method for producing a composite body as well as to a composite body produced with the help of the method, wherein the composite body is formed as a pressure pipe or as a pressure container, wherein the composite body is composed of a main body that is made of steel and of a coat that is made of a fibre composite, said coat enclosing the outside of the main body at least in some sections, wherein, for forming the fibre composite, a fibrous material is wound around the main body, wherein the fibrous material is impregnated with a resin before or after winding, wherein the wound and impregnated fibrous material is heated in order to form the fibre composite.

Such composite bodies are commonly used in, for instance, steam turbine processes or in similar fields of application. The composite body can be formed as a pressure pipe or as a pressure container, through which a fluid having a process temperature of 300 to 650° C. at a pressure of up to 300 bar flows. The main body of the composite body is commonly composed of a martensitic steel or of another high-ally steel. Enclosing the main body with a further coat of fibre composite yields the advantage that the steel can be prevented from creeping, which would otherwise be boosted by the high pressures and temperatures.

For example, such composite bodies, which feature a main body having two coats enclosing the same, are known from document WO 2007/128837 A1. A first coat is composed of a ceramic fibre composite and a second coat is composed of fibre reinforced plastics or of fibre reinforced ceramics. Thus, an increase in the process temperatures in comparison to bodies consisting of steels alone, is supposed to be possible. For instance, a thermal efficiency in a power station can then be stepped up.

What is characteristic for these composite bodies is that the respective composite bodies are always produced outside of the power station or of the industrial plant in which they will later be employed. This is required inasmuch as filaments of the fibre composite can then be wound around, for instance, a pressure pipe on a machine. Impregnating the fibrous material with resin or soaking it in resin as well as finally curing it under workshop conditions are furthermore simplified. Depending on the method that is applied, it may be required to cure the composite body or the fibre composite through a heat treatment within a furnace over a period of several days. Through the treatment in a furnace, heating of the composite body can relatively precisely be controlled and monitored. In particular when forming the fibre composite by means of pyrolysis, particularly high process temperatures have to be kept, which are commonly in the range of more than 700° C. After the composite body has been formed, the same is then installed in a power station or in a similar plant.

In older power stations or plants of this type, there is the problem that a replacement of pressure pipes or of pressure containers is required in said plants after a certain operating period in accordance with the German ordinance on pressure containers (Druckbehälterverordnung). Over a long period of several years, due to the fact that the steel ages or creeps, the cross-section of the pressure pipe or pressure container in question changes, for instance, whereby the compressive strength thereof is reduced. According to the ordinance on pressure containers, the pressure pipe or pressure container in question then needs to be replaced. This in particular concerns older plants, into which composite bodies of the aforementioned type have not been installed, yet. The costs for replacing the pressure pipes or pressure containers are, however, considerable since this requires the entire plant to be shut down for a longer period. Therefore, it would be desirable to avoid downtimes of the plant or to defer a replacement of the pressure pipes or pressure containers as long as possible, for instance until the final decommissioning of the plant, such that a replacement is rendered superfluous.

Therefore, the present invention is based on the task of proposing a method for strengthening pressure pipes or pressure containers, which method avoids downtimes of the plant.

In the method in accordance with the invention for producing a composite body, the composite body is formed as a pressure pipe or as a pressure container, wherein the composite body is composed of a main body that is made of steel and of a coat that is made of a fibre composite, said coat enclosing the outside of the main body at least in some sections, wherein, for forming the fibre composite, a fibrous material is wound around the main body, wherein the fibrous material is impregnated with or soaked in a resin before or after winding, wherein the wound and impregnated fibrous material is heated in order to form the fibre composite, wherein the method is carried out in situ on a built-in pressure pipe or pressure container, wherein the wound and impregnated fibrous material is heated to up to 700° C.

As a consequence, downtimes of plants are avoided with the help of the method in accordance with the invention since the composite body is formed, while a plant is running, at a pressure pipe or at a pressure container of the plant, without said pipe or container having to be removed. By forming the composite body or the coat enclosing the main body that is made of the fibre composite, creeping of the martensitic or high-alloy steel of the main body can effectively be avoided. Thus, it becomes possible to extend a service life of the pressure pipes or pressure containers of the plant by up to 20 years, in this way possibly deferring a replacement of the pressure pipes and pressure containers until after decommissioning of the plant. Through the method in accordance with the invention, considerable cost savings can be achieved since putting a power station, for instance, out of operation in the course of routine maintenance works can completely be avoided or shortened. The composite body or the fibre composite at the main body can hence be formed at the pressure pipe or pressure container which is pressurised and through which a fluid flows by winding the fibrous material around said pipe or container. The fibrous material can be soaked in the resin before or after winding, wherein, for forming the fibre composite, the fibrous material, at the pressure pipe or pressure container, is subsequently heated or treated with a temperature. Through the temperature treatment, the main body is heated to no more than 700° C. Here, it is not possible to use a higher temperature for the main body, as it is done when producing a composite body in a furnace of a workshop according to the state of the art, since the main body is loaded with pressure owing to the fact that the plant is running.

The method can also be carried out in situ while the pressure pipe or the pressure container is being used as intended. In this way, the composite body can be formed, while a plant is running, at a pressure pipe or at a pressure container of said plant, without said pipe or container having to be put out of operation. The composite body or the fibre composite at the main body can hence be formed at the pressure pipe or pressure container which has, for instance, been heated to 530° C. up to 700° C., which is pressurised, and through which a fluid flows, by winding the fibrous material around said pipe or container.

In the method, the resin that is used can be a polysiloxane resin. By using a polysiloxane resin, the fibre composite can be formed without all too high temperatures being required for curing and, if applicable, for pyrolysing the resin.

It is particularly advantageous if a pre-impregnated fibrous material is used. By using a so-called prepreg, the fibrous material and the resin can particularly easily in situ be wound around the main body. Since in a power station, for instance, a plurality of pressure pipes is commonly laid relatively close together for reasons of space, it is often not possible to wind the fibrous material, with the aid of a machine being envisaged therefor, around the pressure pipe in question and to finally impregnate the fibrous material with resin. A pre-impregnated fibrous material can manually also particularly simply be applied directly onto the main body even if there is only limited space. Unidirectional fibre fleece bands, fabrics and rovings can be used for applying the fibre composite. When using fabrics, fabric portions/individual layers may also be laid down such that stacks arise. Thereby, the risk of delaminations and folds in thick walls is lessened. When winding material around geometrically complex main bodies, e.g. pipe bends or pipes having outlets, unidirectional fibre fleece fabric bands having a width of several centimeters may preferably be used.

Before being applied, the pre-impregnated fibrous material can be sealed in a protective film for being protected from moisture. Thus, it becomes possible to store the impregnated fibrous material for a longer time and to transport it. For instance, the fibrous material can then simply be pre-impregnated in a workshop and can subsequently directly be taken to the place of installation, for instance a power station, without running the risk of the pre-impregnated fibrous material being damaged by absorbing moisture.

Moreover, a shrink film can be wound around the wound and impregnated fibrous material. Before the impregnated fibrous material is heated, the shrink film can be shrunk onto the impregnated fibrous material through a brief temperature treatment such that the impregnated fibrous material is substantially hermetically sealed. Thus, an undesired oxidation of the wound and impregnated fibrous material can be prevented during the works that will still follow. Moreover, with the aid of the shrink film, a comparatively smooth surface that is free from impurities, of the finished fibre composite, can then be produced. Stripping the shrink film finally down can be omitted since it can be eliminated in the procedure of heating.

Preferably, the fibrous material can be composed of fibres that are made of aluminium oxide, of silicon carbide, of silicon carbide that is nitride bonded, of glass or of basalt. Such fibres are particularly suitable for forming a fibre composite with the aid of pyrolysis at low temperatures. Nonetheless, said fibres can still guarantee high rigidity. It may also be envisaged to form multiple layers having different fibrous materials in each instance.

Fibre mats of the fibrous material can furthermore be used. In such a case, it becomes possible to wind the fibrous material particularly quickly around, for instance, a pressure pipe in order to surround the pressure pipe with a sufficient amount of fibrous material. The time for which personnel has to work at pressure pipes that have, for instance, a temperature of up to 300° C. can then be considerably shortened.

It can furthermore be envisaged that two thirds of the fibres of the fibrous material, at the very least, are radially oriented in the circumferential direction of the pressure pipe or of the pressure container. The fibres can hence be oriented such that the radial compressive forces of the pressure pipe or of the pressure container can be absorbed particularly well by the fibrous material. Due to the fact that the fibres are not alone radially oriented, it is furthermore possible to also use the fibrous material, for instance, in bend portions of pressure pipes or in areas of pressure containers having a similar shape since the fibrous material can also absorb axial forces. It can furthermore also be envisaged to form the fibre composite or the composite body in the area of a connection weld of a pressure pipe or of a pressure container since said areas can commonly present a lower rigidity. The orientation of the fibres can already be predetermined by the formation of fibre mats or alternatively by winding continuous strands in the corresponding directions.

In order to avoid that the rigidity of the pressure pipe or of the pressure container is lessened or to avoid a creep elongation of the steel during operation, it can be envisaged that heating of the main body is only effected until a tempering temperature of the steel has almost been reached.

In this way, the impregnated fibrous material or the steel of the main body can be heated to 500° C. to up to 680° C., at the very least. On the one hand, the fibre composite can then be cured and formed through pyrolysis, and on the other hand, the main body is prevented from being damaged due to the method being applied.

The method can particularly quickly be carried out if, through the heating process, the wound and impregnated fibrous material is cured and pyrolysed in one single step. In this case, lowering a temperature after curing is then omitted. A temperature gradient can initially lead to a stress redistribution (plastically deformable matrix) upon pyrolysing and ceramicising, and to an inherent stress condition in a winding after cooling. Said inherent stress condition causes tensile stresses in the fibres at an outer edge of the winding and inherent compressive stress in the fibres at an inner edge of the winding. Upon subsequent compressive loading of an internal pipe, this has positive effects on the overall load bearing capacity of said internal pipe.

In a further embodiment of the method, before the heating process, the wound and impregnated fibrous material can be cured through a first heating process in a first step and pyrolysed through the heating process in a second step. In this way, after curing, for instance a quality control of the cured fibre composite can be carried out. The quality control can, for instance, be effected through mobile air-coupled ultrasonics in order to check the fibrous material for faultlessness. In particular, delaminations in a fibre sheath can be detected thereby. For the first heating process, a duration of, for instance, up to 9.5 hours can be envisaged and for the second heating process, a duration of up to 12 hours can be envisaged.

It is furthermore sufficient if the first heating process is effected up to 220° C.

In order to prevent, upon heating, possible spontaneous combustion of materials being used in the course of the fibre composite being formed, a heating-up rate can preferably amount to up to 1 K/min. Any undesired combustion or coking of used insulating materials or heating devices can be prevented.

A resistance wire, a heater mat and/or a heater band can be used for heating. The resistance wire can, for instance, consist of an NiCr wire and be wound around the pressure pipe or around the pressure container with the fibrous material. A heater band can furthermore be wound around the pressure pipe or around the pressure container or a heater mat can cover the pressure pipe or the pressure container. Combinations of the aforementioned heating devices are, as a matter of course, also possible. In order to avoid loss of heat or inflammation, a fire proof insulating material can furthermore surround the heating device.

In order to be able to check a creep behaviour of the steel of the main body, the fibrous material can be wound around at least one wire resistance strain gauge or around a similar sensor of this type. The wire resistance strain gauge can then directly be applied on an outer surface of the main body before winding, such that a strain measurement of the main body is still possible after the composite body has been formed.

The fibrous material can furthermore be wound around at least one temperature, measuring sensor. Since the maximum main body steel temperature that is possible must in particular not be exceeded, the temperature measuring sensor can directly be applied on the steel of the pressure pipe or of the pressure container. In this way, monitoring a heating curve directly upon heating or regulating the heating with the aid of the temperature measuring sensor then also becomes possible.

In order to achieve a particularly high rigidity of the fibre composite, the fibre composite can be impregnated for a second time with a resin after a pyrolysis. After the second impregnation, the resin having been added upon the second impregnation can then again be pyrolysed in each instance. The procedure of the second impregnation and pyrolysis can preferably be repeated for up to three times. By repeatedly filling up any hollow spaces of the fibre composite with resin, a fibre composite having a particularly high density and thus rigidity can be created.

The second impregnation can particularly simply be effected with the aid of vacuum infusion. The vacuum infusion can be carried out in that the fibre composite having been pyrolysed once is surrounded by a tube being filled with resin, wherein the tube is treated with a vacuum. Gases being present in hollow spaces of the fibre composite are removed in this way, such that the resin can easily penetrate the fibre composite or the hollow spaces thereof.

The main body, at which the method is applied, can in particular be a pipe line. It can also be envisaged not to transform the pipe line into a composite body over an entire length, but only in areas of a connection weld and of bends of the pipe line since experience shows that said areas are commonly the first to present a lessened rigidity after a long period of use.

The invention furthermore concerns a composite body, produced with the help of a method according to any one of the preceding claims. Further advantageous embodiments of the composite body result from the description of the features of the dependent claims that refer back to method claim 1.

In the following, a preferred embodiment of the invention is explained in more detail with reference to the annexed drawings.

Figure 2:
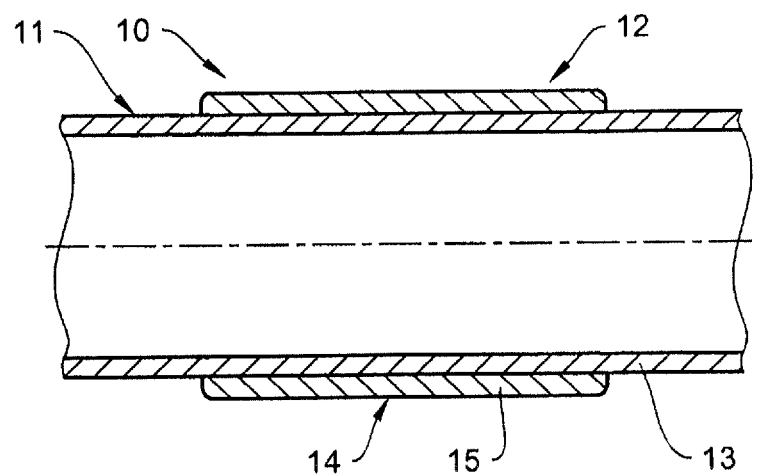

In the figures:
FIG. 1 shows a cross-sectional view of a composite body;
FIG. 2 shows a longitudinal sectional view of sections the composite body.

A combined view of FIGS. 1 and 2 shows a composite body 10 of a pipe line 11. The composite body 10 is formed in an area 12 of the pipe line 11, which features a connection weld that is not illustrated in more detail here. A main body 13 of the pipe line 11 consists of martensitic steel and presents a diameter of up to 300 mm. A wall thickness of the main body amounts to up to 32 mm. The main body 13 is surrounded by a coat 14, which is composed of a fibre composite 15.

A fluid that is not illustrated here and that has a high pressure and a high temperature flows through the pipe line 11 being illustrated here and through the composite body 10, respectively. The fibre composite 15 has been applied onto or has been formed on the built-in pipe line 11 while the pipe line 11 is being operated. Hereunto, a fibrous material has been wound around the main body 13, wherein fibre mats have been used that are impregnated with a resin. Afterwards, the wound and impregnated fibrous material has been covered by a shrink film and heated to up to 680° C. Heating has been effected with the aid of heating elements, which have been arranged around the wound and impregnated fibrous material. Upon heating, the impregnated fibrous material has been cured and a subsequent pyrolysis thereof has been carried out. By repeatedly impregnating the fibre composite 15 with resin through vacuum infusion with a subsequent pyrolysis, a density and thus a rigidity of the coat 14 has been increased even further. The coat 14 or the fibre composite 15 can thus absorb radial forces acting from the pipe line 11 onto the coat 14 and can largely avoid creeping of the steel of the pipe line 11 in area 12 in this way.

The invention claimed is:

1. A method for producing a composite body formed as a pressure pipe or as a pressure container having a main body that is made of steel with a coat of a fibre composite, said coat enclosing the outside of the main body at least in some sections, said method comprising:
    winding a fibrous material around a main body of a built-in pressure pipe or pressure container, wherein the fibrous material is impregnated with a resin before or after winding; and
    heating the wound and impregnated fibrous material in order to form the fibre composite in situ on the built-in pressure pipe or pressure container, wherein the wound and impregnated fibrous material is heated to at least 700° C.

2. The method according to claim 1, in which the method is carried out in situ while the pressure pipe or the pressure container is being used as intended.

3. The method according to claim 1, in which the resin is a polysiloxane resin.

4. The method according to claim 1, in which a pre-impregnated fibrous material is used.

5. The method according to claim 4, in which the pre-impregnated fibrous material is sealed in a protective film.

6. The method according to claim 1, in which a shrink film is wound around the wound and impregnated fibrous material.

7. The method according to claim 1, in which the fibrous material is composed of fibres that are made of aluminium oxide, of silicon carbide or of silicon carbide that is nitride bonded.

8. The method according to claim 1, in which fibre mats of the fibrous material are used.

9. The method according to claim 1, in which at least two thirds of the fibres of the fibrous material are radially oriented in a circumferential direction of the pressure pipe or of the pressure container.

10. The method according to claim 1, in which the heating is effected at a temperature below a tempering temperature of the main body.

11. The method according to claim 1, in which through the heating process, the wound and impregnated fibrous material is cured and pyrolysed in one single step.

12. The method according to claim 1, in which before the heating process, the wound and impregnated fibrous material is cured through a first heating process in a first step and pyrolysed through the heating process in a second step.

13. The method according to claim 12, in which the first heating process is effected up to 220° C.

14. The method according to claim 1, in which a heating-up rate amounts to up to 1 K/min.

15. The method according to claim 1, in which a resistance wire, a heater mat and/or a heater band are/is used for heating.

16. The method according to claim 1, in which the fibrous material is wound around at least one wire resistance strain gauge.

17. The method according to claim 1, in which the fibrous material is wound around at least one temperature measuring sensor.

18. The method according to claim 1, in which the fibre composite is impregnated for a second time with a resin.

19. The method according to claim 18, in which the second impregnation is effected with the aid of vacuum infusion.

20. The method according to claim 1, in which the main body is a pipe line.

* * * * *